United States Patent [19]

Campbell

[11] Patent Number: 5,152,391
[45] Date of Patent: Oct. 6, 1992

[54] HOPPER FEED ELEVATOR

[76] Inventor: Mark D. Campbell, Woodberry Apartments #231, Alexander Dr., Asheville, N.C. 28801

[21] Appl. No.: 640,934

[22] Filed: Jan. 14, 1991

[51] Int. Cl.⁵ .............................................. B65G 17/36
[52] U.S. Cl. .......................... 198/550.01; 198/550.2; 198/443
[58] Field of Search .............. 198/393, 396, 443, 453, 198/550.01, 550.2

[56] References Cited

U.S. PATENT DOCUMENTS

| | | | |
|---|---|---|---|
| 3,049,216 | 8/1962 | Campbell | 198/443 |
| 3,251,456 | 5/1966 | Branine | 198/669 X |
| 3,580,388 | 5/1971 | Resener | 198/690.2 |
| 3,882,994 | 5/1975 | Mecks et al. | 198/397 |
| 4,008,801 | 2/1977 | Reilly et al. | 198/841 |
| 4,537,300 | 8/1985 | Facchini | 198/453 |
| 4,588,069 | 5/1986 | Sticht | 198/443 |
| 4,742,906 | 5/1988 | Wallaart | 198/805 |
| 4,798,281 | 1/1989 | Egger | 198/698 |
| 4,832,175 | 5/1989 | MacIntyre | 198/396 X |
| 4,844,236 | 7/1989 | Kraus | 198/690.2 |
| 4,860,881 | 8/1989 | Sticht | 198/443 |

Primary Examiner—Robert P. Olszewski
Assistant Examiner—Cheryl L. Gastineau
Attorney, Agent, or Firm—David M. Carter

[57] ABSTRACT

There is provided an improved hopper feed elevator utilizing an endless conveyor passing through a bin containing parts to be elevated. A curved tunnel is juxtaposed to an opening at the bottom of the bin. The endless conveyor passes through the curved tunnel. The endless conveyors includes a plurality of curved cleats which closely conform to the shape of the tunnel so as to avoid jamming of the apparatus by the parts. One wall of the tunnel may be formed as a spring loaded back plate so that the cross section of the tunnel is made variable.

13 Claims, 6 Drawing Sheets

HOPPER FEED ELEVATOR

BACKGROUND OF THE INVENTION

This invention relates to machines for conveying materials. More particularly it relates to hopper feed elevators.

Hopper feed elevators are commonly used in factories where there are requirements for removing parts from a storage facility and for segregating parts into smaller groups for an assembly or other operation. A large storage bin, or hopper, containing a large number of parts is situated on the factory floor with a somewhat vertically oriented endless belt or chain having a plurality of cleats thereon passing through the hopper. The moving cleats elevate the parts to a position above the storage hopper. The parts are dumped on a horizontal conveyor, orientor, furnace, or the like in small evenly dispersed amounts as the cleats pass over a roller at the top of the apparatus.

Quite often the parts are rather small pieces such as, for example, machine screws. One of the most common problems which occur with hopper feeder elevators is jamming of the apparatus at and/or below the place where the cleats enter the storage hopper at the bottom of the hopper, particularly when elevating small or thin parts. Often the small parts will become wedged between a cleat and the interface at the opening at the bottom of the hopper.

Two examples of prior art hopper feed elevators are shown in U.S. Pat. No. 3,049,216 issued to Milford A. Campbell, and U.S. Pat. No. 4,860,881 issued to Walter Sticht. The Campbell patent shows a hopper feed elevator which utilizes a housing disposed beneath an opening in a bin containing the parts to be conveyed leaving spaced channels through which lugs on the conveyor may travel. The Sticht patent shows a conveyor belt passing through a bin having cleats on a belt which pass by a gap in the lower portion of the bin.

OBJECTS OF THE INVENTION

It is therefore one object of this invention to provide an improved hopper feed elevator.

It is another object to provide a hopper feed elevator which substantially reduces jamming.

It is still another object to provide a hopper feed elevator which is reliable and uncomplicated.

It is still another object to provide a hopper feed elevator which automatically frees a jammed part.

It is yet another object to provide a hopper feed elevator which can be used in applications for small, sharp, and/or thin parts with reliability.

SUMMARY OF THE INVENTION

In accordance with one form of this invention there is provided an apparatus for conveying material including an endless conveyor. A mechanism is provided for moving the conveyor. A plurality of cleats are attached to the conveyor at spaced apart intervals. Each of the cleats has a edge. The apparatus includes a container for receiving the material in bulk to be conveyed with a first portion of the conveyor received in the container. The container includes an opening and a tunnel communicating with the opening. The tunnel is hollow and has at least one wall and has first and second open ends. The first open end of the tunnel is contiguous with the opening in the container. A second portion of the conveyor is received in the tunnel. The cross-section of at least a portion of the tunnel substantially conforms to the shape of one of the surfaces of each cleat thereby providing limited clearance between said edge of each cleat and at least one wall of the tunnel so as to reduce jamming of the apparatus by the material as the cleats move through the tunnel.

It is preferred that the wall of the tunnel and the edges of the cleats are curved in substantial conformance with one another. It is also preferred that the length of the tunnel and the spacing of adjacent cleats is such that at least one cleat is inside the hollow region of the tunnel at all times. It is also preferred that the tunnel include a second wall or back plate which is adapted to move or adjust against the conveyor enabling the limited clearance for the cleats and also so that if jamming occurs the back plate will move, thereby automatically freeing the jammed part and the apparatus will continue to operate. Alternatively the curved wall of the tunnel may be moveable or adjustable while the second wall remains stationary or both the tunnel and second wall could be moveable or adjustable.

BRIEF DESCRIPTION OF THE DRAWINGS

The subject matter which is regarded as the invention is set forth in the appended claims. The invention itself, however, together with further objects and advantages thereof, will be better understood by reference to the following description taken in conjunction with the accompanying drawings in which:

DESCRIPTION OF THE PREFERRED EMBODIMENT

Figure 1:
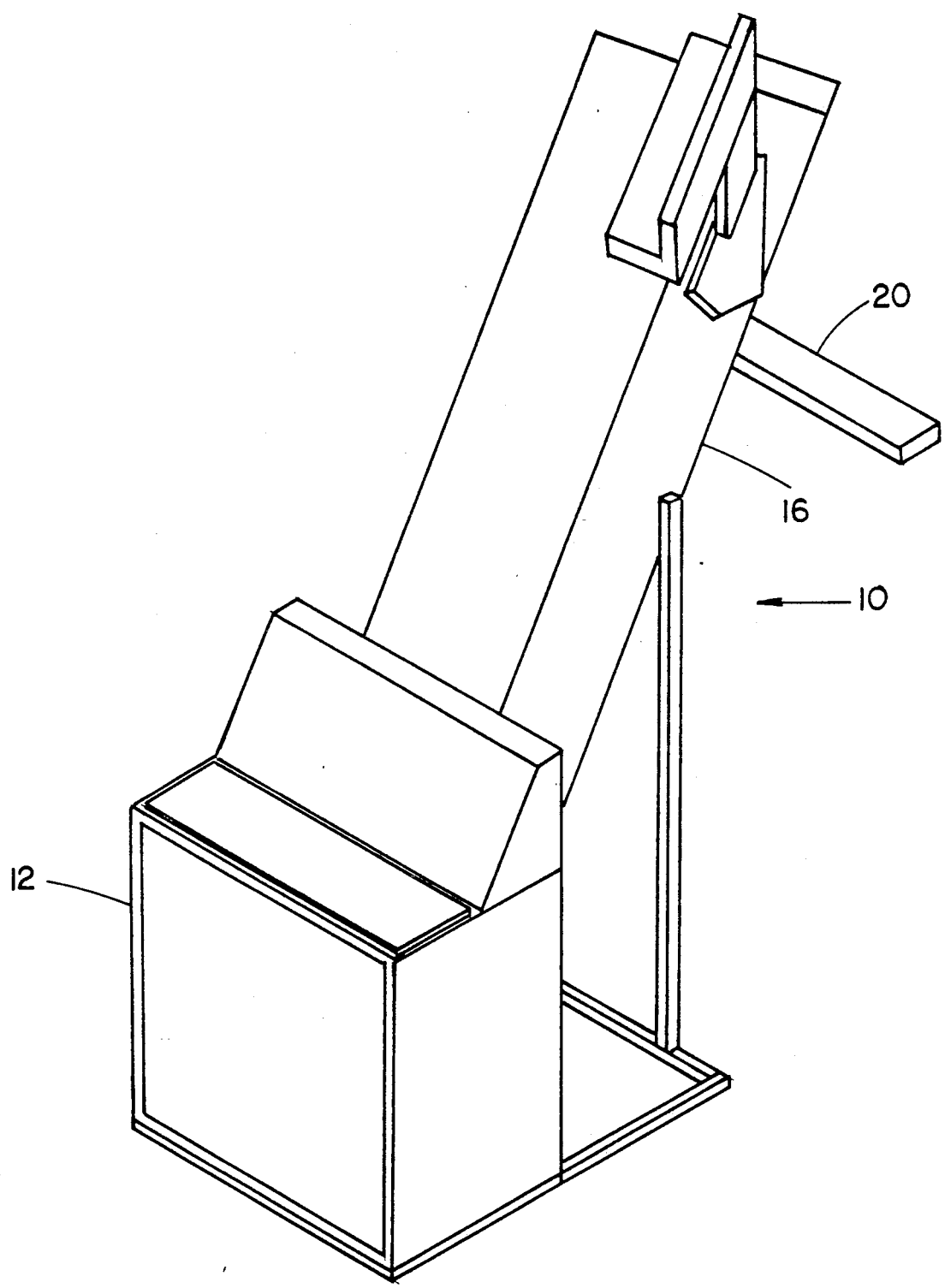
FIG. 1 is a pictorial view showing the housing for the apparatus of the subject invention.
Figure 2:
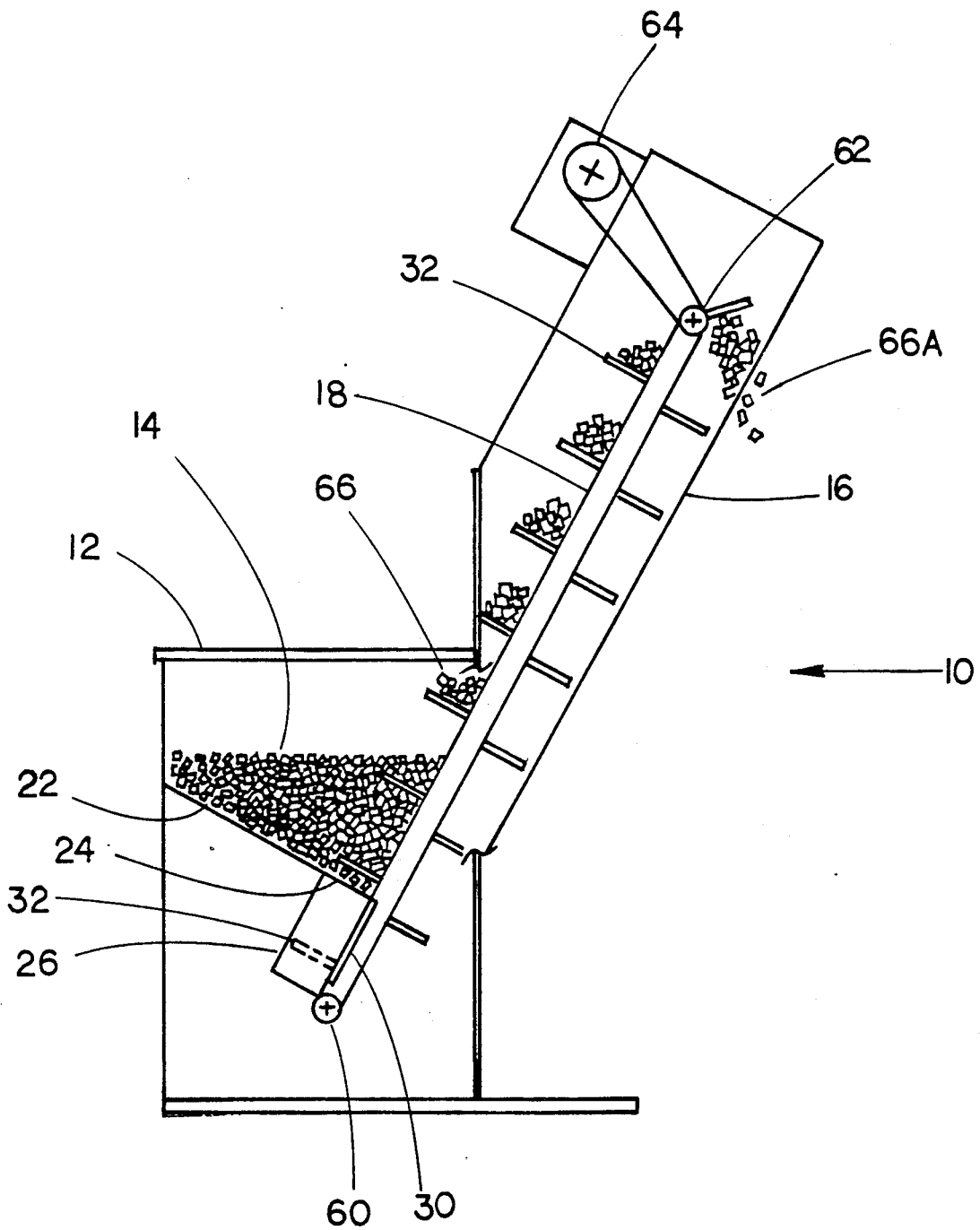
FIG. 2 is a side elevational view of the apparatus of the subject invention with portions of the housing removed for illustrative purposes.
Figure 3:
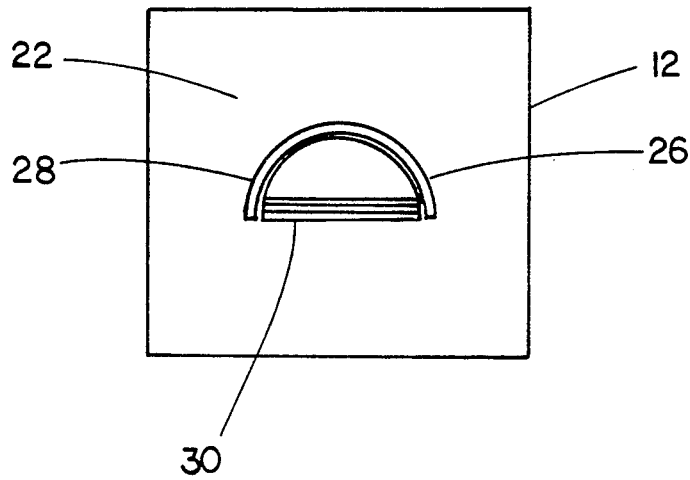
FIG. 3 is a top view of the inside of the hopper portion of the apparatus of FIG. 2.
Figure 4:
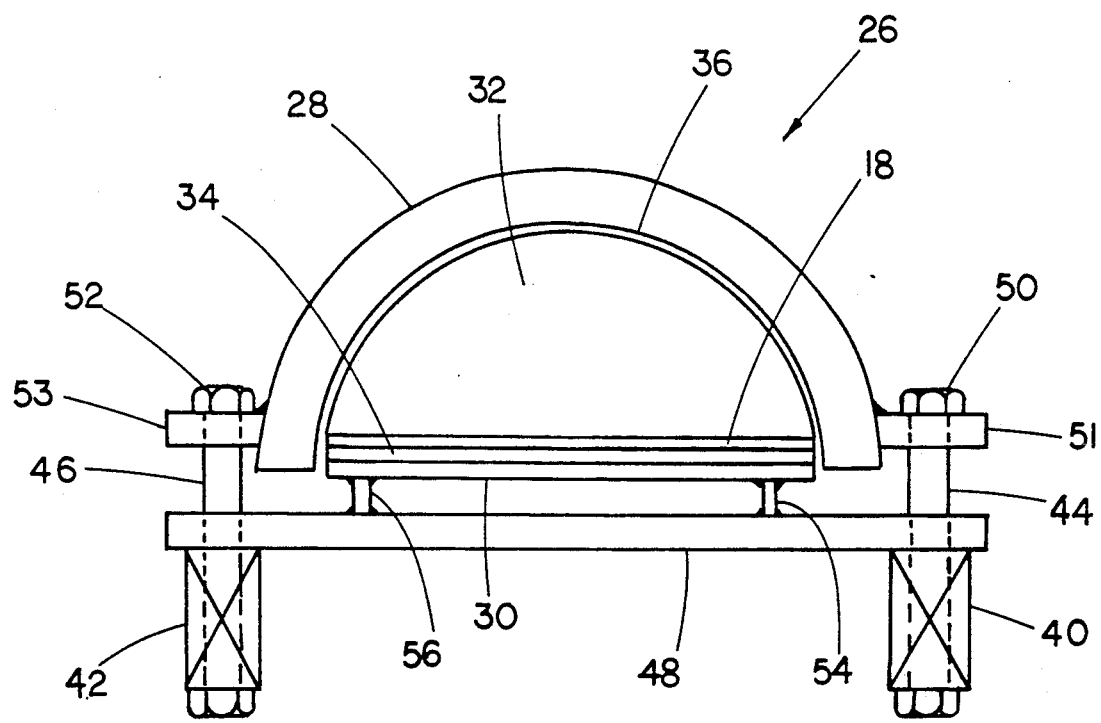
FIG. 4 is a top view of the tunnel portion of the apparatus of FIG. 3 with the hopper having been removed.
Figures 5, 6:
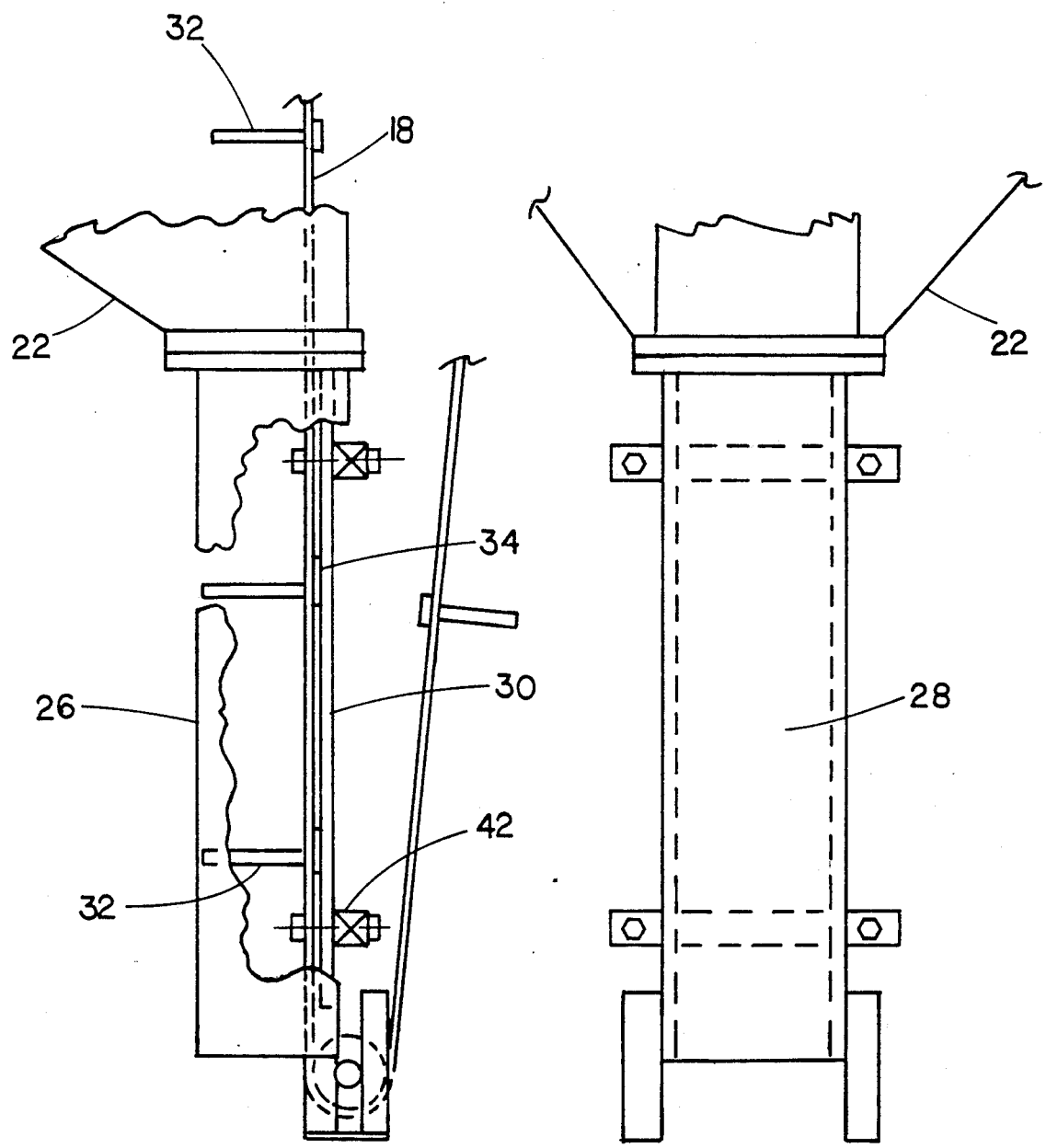
FIG. 5 is a side elevational view of the apparatus of FIG. 4.
FIG. 6 is a side elevational view of the apparatus of FIG. 4 showing another side of the apparatus of FIG. 4.
Figure 7:
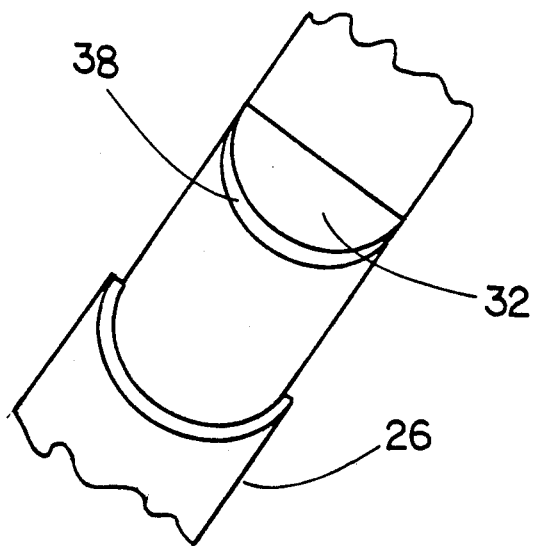
FIG. 7 is a partial pictorial view of a portion of the tunnel shown in FIG. 4.

Referring now more particularly to FIGS. 1 through 9, there is provided hopper feeder elevator 10 including a storage bin or hopper 12 containing a volume of material such as parts 14. An upward extension 16 is connected to hopper 12 and houses a portion of endless conveyor 18, which in this embodiment is in the form of a belt. The term belt is used broadly herein to mean any continuous loop such as a belt, chain, line, or wire for moving material. Belt 18 is oriented somewhat vertically and passes around pulleys 60 and 62. Pulley 62 is driven by motor 64 which moves the belt.

Horizontal belt 20, or a chute or other receiver as desired, is under an opening in the top part of upward extension 16. Storage hopper 12 includes sloped inside walls 22 for funneling the material 14 towards the lower portion of the hopper. The lower portion of hopper 12 has an opening 24 therein. Juxtaposed to and below opening 24 is elongated tunnel 26 which, in the preferred embodiment, includes curved wall 28 and back plate 30 which forms a back wall of the tunnel. In the preferred embodiment curved wall 28 is bolted or welded to the bottom of hopper 12 adjacent to opening 24 in a known fashion.

Endless belt 18 contains a plurality of spaced apart cleats 32 which pass through tunnel 26, through hopper 12, and through upward extension 16. The term cleat(s) is used broadly herein to mean any apparatus attached to a belt or chain for holding material. Cleats 32 may be constructed in various shapes and designs to act as take way or receiving vessels. Cleats 32 pick up metered amounts 66 of material 14 for depositing metered amounts 66A predetermined distances from one another on horizontal belt 20. It should be noted that the preferred design of the cleats and tunnel include curved portions so that straight parts such as screws and bolts are less likely to be wedged between a cleat and the inside wall of the tunnel. However, the tunnel and cleats could be constructed in other shapes.

Each cleat is held onto the belt by means of washer 34 which attaches the cleat to a belt in a known fashion. The outer edge 38 of each cleat 32 is curved so as to conform substantially to the inside curved surface 36 of wall 28 of tunnel 26. These complimentary surfaces 36 and 38 provide for a substantially interference fit of the cleat within tunnel 26 so that there is little possibility of the material 14 passing through tunnel 26 without being picked up by a cleat 32. It is preferred that the length of tunnel 26 and the space between adjacent cleats is such that at least one cleat is received within tunnel 26 at all times, otherwise material 14 would escape from hopper 12. Preferably there are two cleats 32 within the tunnel 26 at all times.

Figure 8:
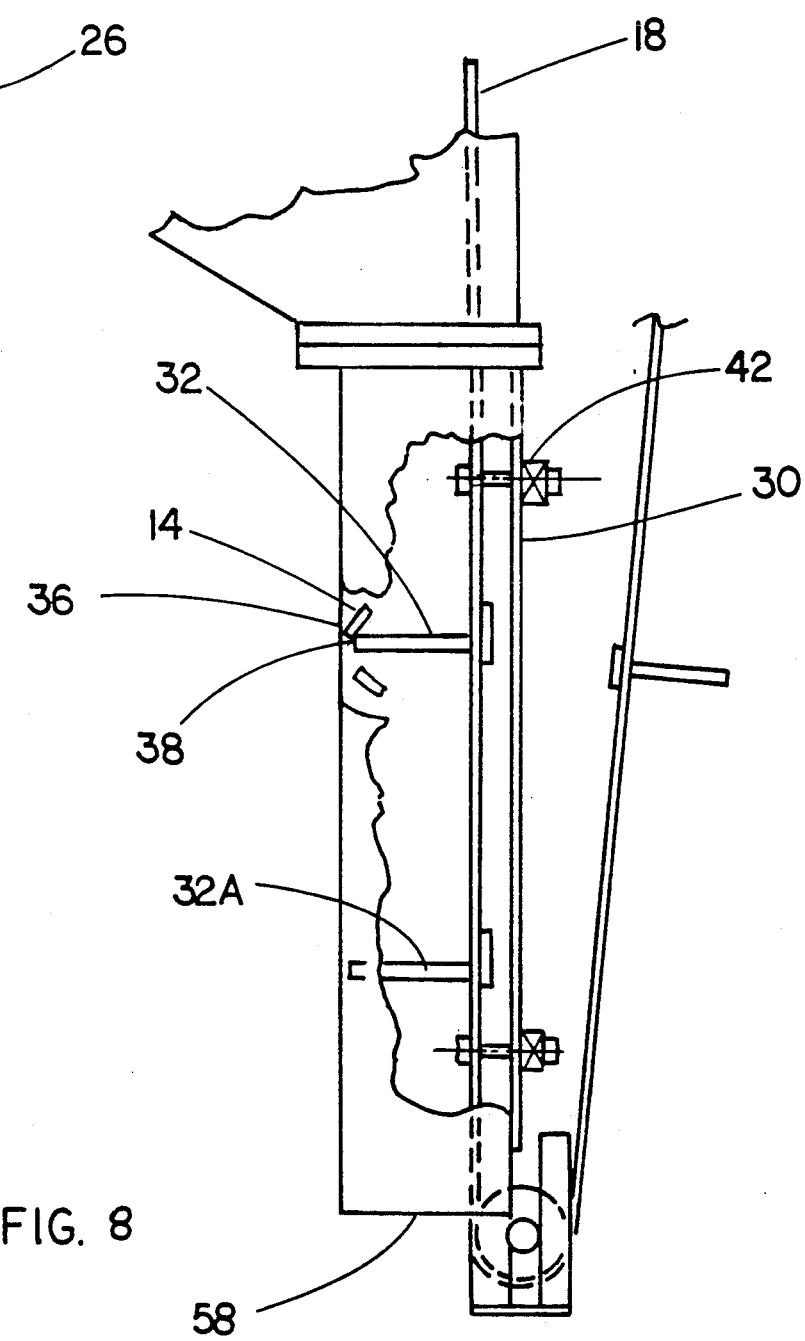
FIG. 8 is a side elevational view of the apparatus of FIG. 5 showing a part of the tunnel flexed outwardly to avoid jamming.

Because of the substantial interference fit between inside surface 36 of the tunnel and the surface 38 of each cleat, it is desirable that the tunnel not be a completely rigid body. Therefore, in the preferred embodiment back plate 30 is provided and forms a moveable wall of the tunnel. The wall, and thus the tunnel, is moveable due to its attachment to springs 40 and 42 which are respectively mounted on rods 44 and 46. Back plate 30 is mounted to plate 48 through studs 54 and 56. Ears 51 and 53, having holes therein for receiving rods 44 and 46, are welded to curved wall 28. Rods 44 and 46 are mounted to ears 51 and 53 through known fastening devices 50 and 52. Thus back plate 30 is movably connected to curved wall 28. If the fit of a particular cleat is too tight for the tunnel, the back plate will move in order to accommodate the tight fitting cleat. Furthermore, as shown in FIG. 8, if material 14 becomes wedged between the surface 38 of cleat 32 and inside surface 36 of the tunnel, outward movement of a portion of the tunnel will occur due to the movement of the back plate 30 thereby permitting belt 18 to move. Thus the surface 38 of cleat 32 moves away from surface 36 of the tunnel so that the wedged material passes down below the cleat 32 and the apparatus will not readily jam and will automatically unjam. The material 14 which passes through the tunnel may then be picked up by the adjacent cleat 32A or it may pass through the bottom opening 58 of the tunnel.

Figure 9:
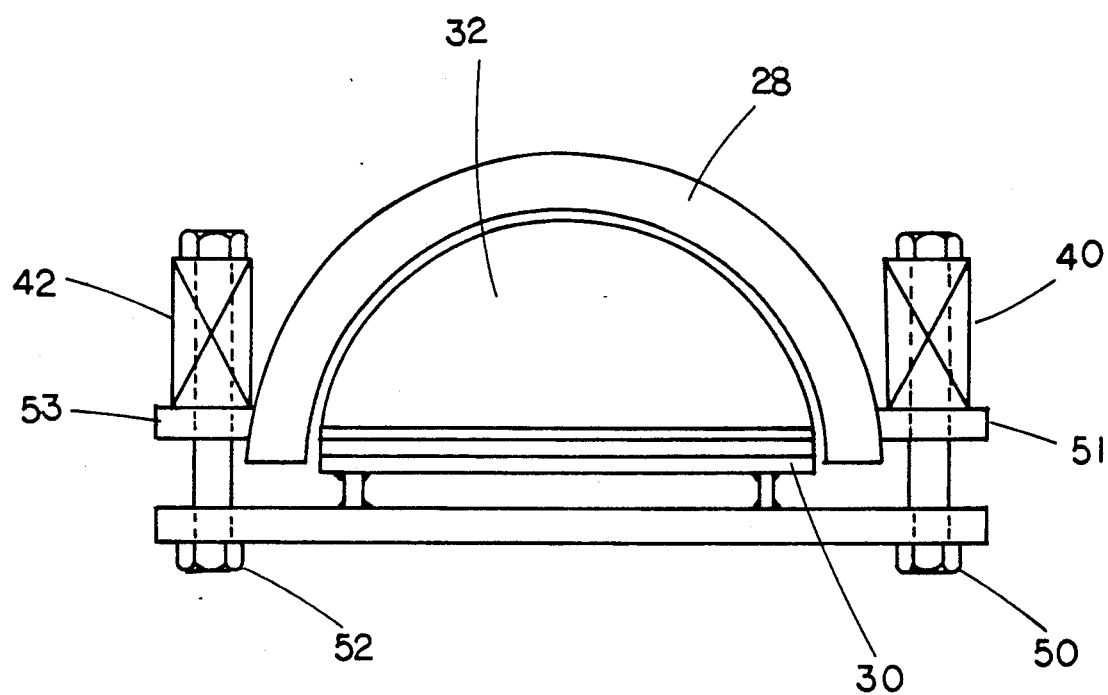
FIG. 9 is a top view of the tunnel portion of the apparatus of FIG. 3 with the hopper having been removed showing an embodiment as an alternative to the apparatus shown in FIG. 4.

While the preferred embodiment shows the flat back plate 30 being moveable, alternatively, as illustrated in FIG. 9, the curved portion 28 of the tunnel could be made moveable while flat back plate 30 could be maintained in a fixed position. In the embodiment of FIG. 9 spring 40 and fastening device 50 are reversed and spring 42 and fastening device 52 are also reversed from their position shown in the embodiment of FIG. 4. Back plate 30 may be made rigid by welding or bolting it to the bottom of hopper 12 in a known fashion. With the springs 40 and 42 in contact with ears 51 and 53 the curved portion 28 of the tunnel will float and the back plate 30 will remain rigid.

The apparatus described herein enables one to store and elevate parts or other products in a metered flow without damage to the parts and readily runs thin and pointed products without fear of jamming the machine. For example, thin stampings, pointed sharp parts, and very small parts and products with scrap or tramp material, flashing and chips can easily be run using this apparatus. By using a tunnel having a portion which is spring biased inwardly, tension is kept on the belt and thus the tight interference fit within the tunnel with the cleats is maintained. However, with the use of a tunnel floating portion, if a part does come between the cleat and the wall of the tunnel, a portion of the tunnel will readily move out of the way, permitting the part to pass below the cleat after which the floating portion of the tunnel such as back plate 30 would again press the cleat back into a substantial interference fit with the inside surface of the tunnel.

From the foregoing description of the preferred embodiment of the invention, it is apparent many modifications may be made therein without departing from the true spirit and scope of the invention and it is intended in the appended claims to cover all such modifications.

I claim:

1. An apparatus for conveying material comprising:
an endless conveyor;
means for moving said conveyor;
a plurality of cleats attached to said conveyor at spaced apart intervals; each of said cleats having an edge;
a container for receiving the material to be conveyed;
a first portion of said conveyor received in said container;
an opening in said container;
a tunnel communicating with said opening;
said tunnel having at least one wall and having first and second open ends; said first open end of said tunnel being contiguous with said opening in said container; a second portion of said conveyor received in said tunnel;
a hollow region formed within said tunnel; the cross-section of at least a portion of said tunnel substantially conforming to the shape of one of the surfaces of each said cleats thereby providing substantially an interference fit between said edge of each of said cleats and said at least one wall of said tunnel while permitting said cleats to move through said tunnel;
-means for permitting the expansion of said hollow region.

2. An apparatus for conveying material comprising:
an endless conveyor;
means for moving said conveyor;

a plurality of cleats attached to said conveyor at spaced apart intervals; each of said cleats having an edge;

a container for receiving the material to be conveyed;

a first portion of said conveyor received in said container;

an opening in said container;

a tunnel communicating with said opening;

said tunnel having at least one wall and having first and second open ends; said first open end of said tunnel being contiguous with said opening in said container; a second portion of said conveyor received in said tunnel;

a hollow region formed within said tunnel; the cross-section of at least a portion of said tunnel substantially conforming to the shape of one of the surfaces of each of said cleats thereby providing limited clearance between said edge of each of said cleats and said at least one wall of said tunnel; said at least one wall is curved; portions of said edges of said cleats being curved in substantial conformance with the curve of said at least one wall.

3. An apparatus as set forth in claim 1 wherein the length of said tunnel and the spacing of adjacent cleats is such that at least one cleat will be inside of said tunnel at all times during the operation of the apparatus.

4. An apparatus as set forth in claim 1 wherein said opening is in the lower portion of said container; said conveyor being oriented somewhat vertically whereby the material in said container may be elevated by said conveyor.

5. A apparatus for conveying material comprising:

an endless conveyor;

means for moving said conveyor;

a plurality of cleats attached to said conveyor at spaced apart intervals; each of said cleats having an edge;

a container for receiving the material to be conveyed;

a first portion of said conveyor received in said container;

an opening in said container;

a tunnel communicating with said opening;

said tunnel having at least one wall and having first and second open ends; said first open end of said tunnel being contiguous with said opening in said container; a second portion of said conveyor received in said tunnel;

a hollow region formed within said tunnel; the cross-section of at least a portion of said tunnel substantially conforming to the shape of one of the surfaces of each of said cleats thereby providing limited clearance between said edge of each of said cleats and said at least one wall of said tunnel; said tunnel has at least a second wall; means for permitting movement of at least one wall whereby a cross section of said hollow region inside of said tunnel may be varied.

6. An apparatus as set forth in claim 5 further including a tension means associated with said tunnel.

7. An apparatus as set forth in claim 6 wherein said tension means is at least one spring contacting said second wall whereby said second wall is moveable.

8. An apparatus as set forth in claim 6 wherein said tension means is at least one spring contacting said at least one wall; said at least one wall being curved; whereby said curved wall is moveable.

9. An apparatus as set forth in claim 5 wherein said second wall is a back plate and is located adjacent to said second portion of said conveyor on the side of said conveyor not receiving said cleats; said tension means contacting said back plate.

10. An apparatus as set forth in claim 6 wherein said tension means is at least one spring.

11. An apparatus as set forth in claim 5 wherein substantially zero clearance exists between said at least one wall and said edge of each of said cleats when located inside of said tunnel.

12. An apparatus as set forth in claim 3 wherein the length of said tunnel and the spacing of adjacent cleats is such that at least two cleats will be inside of said tunnel at all times.

13. An apparatus for conveying material comprising:

an endless conveyor;

means for moving said conveyor;

a plurality of cleats attached to said conveyor at spaced apart intervals;

a container for receiving the material to be conveyed;

a first portion of said conveyer received in said container;

an opening in said container;

a tunnel communicating with said conveyor;

a second portion of said conveyor received in said tunnel;

at least one of said cleats being received in said tunnel;

a cross-section of said tunnel being variable, thereby reducing the probability of jamming the apparatus.

* * * * *